United States Patent [19]

Paul et al.

[11] Patent Number: 4,872,433
[45] Date of Patent: Oct. 10, 1989

[54] COMBUSTION CHAMBER CONFIGURATIONS FOR TWO CYCLE ENGINES

[76] Inventors: Marius A. Paul; Ana Paul, both of 1100 Orangethorpe Ave., Ste. 140, Anaheim, Calif. 92801

[21] Appl. No.: 129,453

[22] Filed: Dec. 7, 1987

[51] Int. Cl.[4] ............................................. F02B 23/02
[52] U.S. Cl. .............................. 123/257; 123/65 VC; 123/262; 123/270; 123/275; 123/290; 123/299; 123/301; 123/307; 123/663
[58] Field of Search ............... 123/299, 300, 307, 290, 123/257, 65 VC, 261, 262, 263, 270, 271, 275, 289, 301, 663, 661

[56] References Cited

U.S. PATENT DOCUMENTS

| | | | |
|---|---|---|---|
| 811,744 | 2/1906 | Reichenbach | 123/275 |
| 1,691,172 | 11/1928 | Winckler | 123/275 |
| 1,816,432 | 7/1931 | Hill | 123/262 |
| 2,236,950 | 4/1941 | Ricardo | 123/257 |
| 2,256,776 | 9/1941 | Kammer | 123/261 |
| 2,570,616 | 10/1951 | Welsh | 123/299 |
| 2,606,538 | 8/1952 | Malin | 123/301 |
| 2,655,906 | 10/1953 | Udale | 123/257 |
| 2,658,487 | 11/1953 | Basabe | 123/275 |
| 2,840,059 | 6/1958 | Buchi | 123/262 |
| 4,543,928 | 10/1985 | von Seggern | 123/257 |

FOREIGN PATENT DOCUMENTS

| | | | |
|---|---|---|---|
| 31440 | 3/1923 | Denmark | 123/307 |
| 625948 | 7/1949 | United Kingdom | 123/261 |

OTHER PUBLICATIONS

Copy of WO86/04388 PCT application No. PCT/US86/00137, published Jul. 31, 1986.

*Primary Examiner*—Andrew M. Dolinar
*Attorney, Agent, or Firm*—Bielen and Peterson

[57] ABSTRACT

Improved combustion chamber configurations for two-cycle engines with high pressure fuel injected systems having reciprocal pistons, cylinders with multiple injectors for each cylinder and a cylinder head liner with a chamber having a discoidal configuration that cooperates with a piston head structure to generate a toroidal, swirling, compressed air flow during compression strokes of the reciprocating piston.

7 Claims, 2 Drawing Sheets

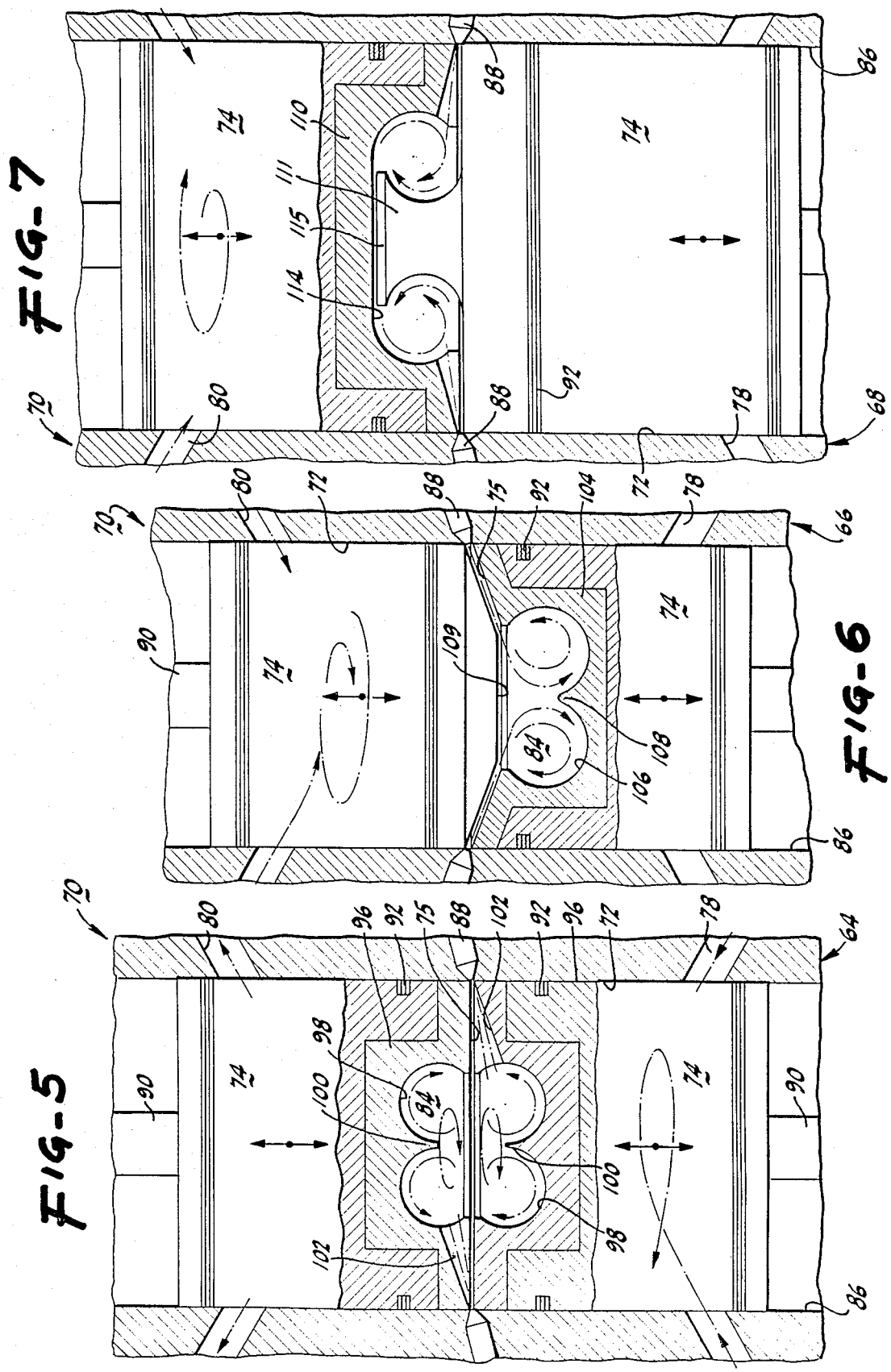

//4,872,433//

COMBUSTION CHAMBER CONFIGURATIONS FOR TWO CYCLE ENGINES

BACKGROUND OF THE INVENTION

This invention relates to improved combustion chamber configurations for two-cycle engines. In particular the combustion chamber designs are for high pressure fuel injected systems requiring exaggerated chamber designs to insure a full and complete combustion that uniformly distributes the combustion forces over the head of the piston in a manner that maximizes the power stroke.

In short-stroke, high-compression engines that are fuel injected, there is little time in which to complete combustion. The injection process must therefore be precisely timed with the compression stroke to inject the fuel charge without premature combustion, but in a manner that fully mixes the injected fuel with the compressed air such that on auto combustion the advancing flame front rapidly consumes the fuel air mix without a damaging effect from the high pressure shock wave. In two-cycles engines having a mono valve exhaust system in which a single large valve is centrally located over the piston shock waves can be potentially damaging unless diverted from the central axis of the valve. Similarly, the center of the piston head is potentially a structurally weak spot that can be adversely affected by a symmetrically formed detonation and focused shock waves.

In similar prior art configurations, for example, as shown in Basabe, Pat. No. 2,658,487, issued November, 1953, entitled, combustion chambers partially isolated from the cylinder of the piston have been devised with configurations that produce turbulence patterns conducive to full and complete combustion. However, while the combustion chamber of Basabe is configured to develop the swirl and squish important to formation of a turbulence pattern that enhances combustion, the heart shape configuration of the resultant design does not fully protect the single exhaust valve from the peak pressures that are potentially dangerous to the structural integrity to the valve in a short stroke high pressure piston. Although the valve of the Basabe engine has a central prominence to divert the pressure front eminating from the piston head, the, prominence is insufficient to insulate the valve face from the pressure forces developed in an ultra-high pressure combustion.

The configuration described in Basabe is for a two-stroke internal combustion engine having a relatively long stroke and is particularly designed to develop jets of air into the combustion chamber at very high temperature so as to specifically enable ignition of the fuel without a very high degree of compression, and hence a very high mean effective pressure. Applicants, on the other hand seek to define configurations that will enable extraordinary high combustion chamber pressures without the destruction of either the piston head or, in those embodiments using mono-valve exhaust systems, the exhaust valve. To accomplish such, exaggerated configurations are employed to not only generate the annular turbulence pattern desired, but to protect both piston head and exhaust valve. In certain embodiments the combustion chamber configurations develop a double squish action to further enhance turbulant action.

SUMMARY OF THE INVENTION

The combustion chamber configurations of this invention are directed to internal combustion engines with reciprocating pistons that are arranged in opposition, in opposed piston engines, or which are arranged with mono valve exhaust systems. Usually, in such systems, the high pressures and temperatures necessary to achieve efficient engine operation can be damaging to the piston head or the valve head. In particular, where ceramic inserts or linings are to be utilized for adiabetic engine systems, conventional configuration of combustion chambers are inadequate to provide the structural integrity to withstand the high pressure charge with a potentially erratic shock wave.

In the embodiments incorporating a mono valve exhaust system, the preferred piston head is provided with either a substantial projection that generates a turbulence annulus, such that a shock wave proceeding the burn front is directed away from the face of the valve, or, a recess in the piston head to generate a symmetrically turbulent annulus that similarly directs the shock wave away from the face of the valve. Both configurations are designed to protect the structural integrity of the piston head as well as provide a rapid and thorough combustion of combustion gases.

In the embodiments in which opposed pistons are provided, the combustion chambers again generate an annular turbulence pattern that combines squish and squirl to allow a rapid burn without a deleterious shock wave being imparted to the piston head. In the configurations proposed the burn patterns are substantially symmetrical about the axis of the piston in order to reduce asymmetrical forces being applied to the piston that may cause side forces that generate piston knock or slap.

The configurations devised allow for use of ceramic inserts that may be moldcast to the intricate configurations designed. Use of such ceramic inserts will permit substantially higher temperatures to be generated in the combustion chambers with resultant improvement in efficiencies and engine operation. Furthermore, by utilizing multiple fuel injectors spaced around the essentially torroidial combustion chambers, fuel can be injected from multiple points to increase the turbulence, particularly the swirl, to form more than a single flame front to divide and diminish the undesirable shock waves, and importantly, to reduce the time to inject a fine spray charge into the chamber during high speed operation.

In summary, the configuration of the combustion chambers and the controlled operation of the fuel injectors, as described in greater detail hereafter, combine to diminish the intensity of the undesirable shock wave and improve the timing and pattern of spray of an injected fuel charge for thorough combustion. The use of multiple injectors in conjunction with an annular configured chamber provides great versatility in both the sequence and pattern of the injection process. For example, during periods of minimal fuel demand a single injector can supply fully atomized fuel to the combustion chamber. Similarly during periods of high demand all injectors can be operated in unison or in sequence to deliver a fine spray in a short time.

Furthermore, preignition can be effected by a preliminary spot injection by one of the injectors before the full charge is delivered by the remaining injectors. These and other advantages in the combustion chamber

BRIEF DESCRIPTION OF THE DRAWINGS

FIG. 5 is a cross sectional view of a combustion chamber configured in an opposed piston engine of a first configuration.

FIG. 6 is a cross sectional view of the combustion chamber in an opposed engine of a second configuration.

FIG. 7 is a cross sectional view of a combustion chamber in an opposed piston engine of a third configuration.

DETAILED DESCRIPTION OF THE PREFERRED EMBODIMENTS

Figure 2:
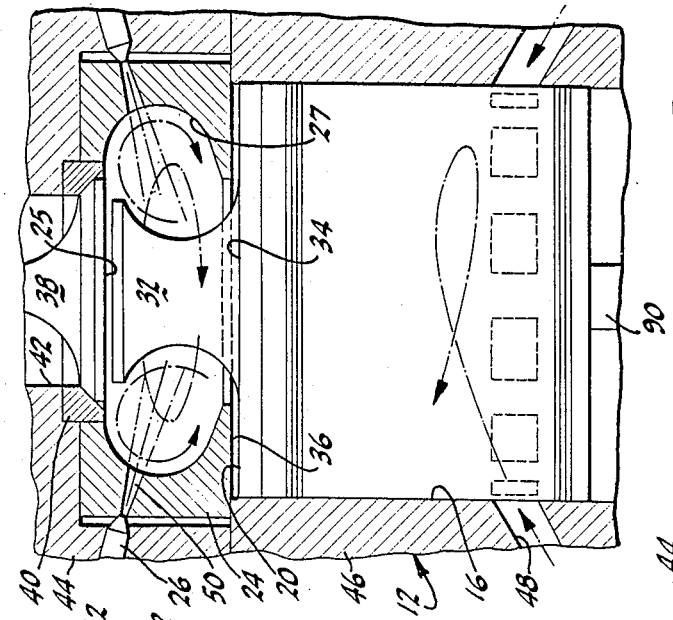
FIG. 2 is a cross sectional view of a combustion chamber of a mono-valve engine having a second chamber configuration.
Figure 1:
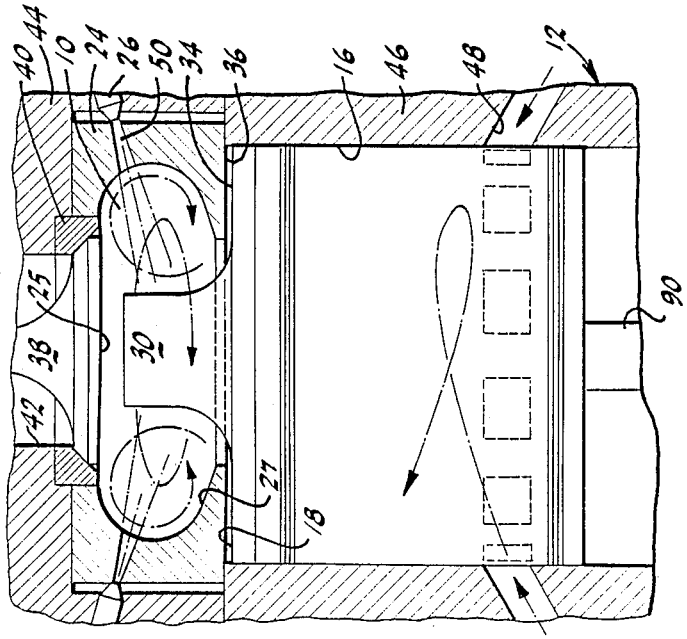
FIG. 1 is a cross sectional side view of a combustion chamber in a mono-valve engine having a first configuration.
Figure 3:
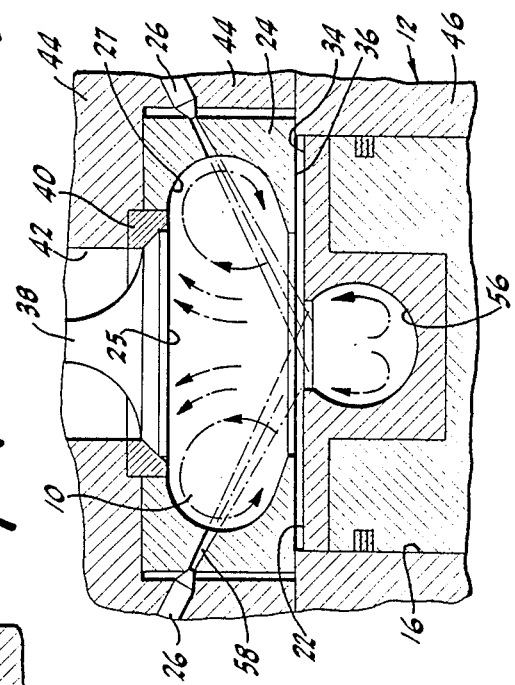
FIG. 3 is a cross sectional view of a combustion chamber in a mono valve engine having a third configuration.

Referring now to FIGS. 1–3 of the drawings, three variations in the configuration of a combustion chamber 10 for an internal combustion engine, designated generally by the reference numeral 12, are shown. The engine 12 is shown only in part with a focus on the combustion chamber configuration and fuel injector arrangement for a two cycle, mono-valve of a high temperature, high pressure type. The configuration of the combustion chamber 10 are formed by the piston cylinders 16, the piston heads 18, 20 and 22, the cylinder head liners 24 and the valve head 25. Each chamber is equipped with multiple fuel injector nozzles 26. In each of the three embodiments shown, the cylinder head liners are similar in configuration, with only minor modifications in the embodiment of FIG. 3 to accommodate differently directed fuel injection nozzles 26.

The configuration of the cylinder head liner 24 is circular with rounded edges which encourages an annular or toroidal flow pattern of the compressed air as described in in greater detail hereafter. In the embodiments of FIG. 1 and 2, the annular configuration of the resultant chamber is fully defined by piston head projections 30 and 32 which project from the center of the piston heads 18 and 20. The piston head projections 18 and 22 not only deflect the accelerated flow of compressed air in the piston cylinder 16 that squished between the flat portion of the piston head 34 and the underside 36 of the cylinder head liners 24 as the piston rises, but in a secondary squish between the top of the projections and the face of the valve head, deflects the gases away from the valve head 25 to protect the valve from pressure shocks when fuel injected into the highly compressed air is ignited.

The head 25 of the valve 38 is seated in an annular valve seat 40 that forms the orifice for a large exhaust passage 42 when the exhaust valve 38 is projected into the combustion chamber 10 during exhaust and scavenging after the power stroke and before the compression stroke. The valve seat 40 and cylinder head liners 24 are inset in the engine head 44 which is connected to the engine block 46 by conventional fasteners (not shown). Operation of this poppet valve 38 is conventionally performed by a cam or other conventional means known in the art.

Focusing again on the combustion chamber configuration, the configuration is designed to induce a turbulent annular flow of compressed air into the combustion chamber for insuring a rapid mixture and detonation of the injected fuel. This flow pattern is initiated during the scavenging process when the piston is retracted from the combustion chamber and is at the end of its expansion or power stroke. In such positions, tangentially oriented intake ports 48 provide of entry for pre-compressed air through the block 36 and into the piston cylinder 16 in a swirling manner as schmetically illustrated by the directional arrow in FIGS. 1 and 2 of the drawings. With the exhaust valve in an open position, remaining combusted gases are scavenged through the exhaust port 42 by the introduced compressed air. With the exhaust valve 38 closed, the advancing piston displaces the air charge into the air chamber 10 and at the peak of compression induces a high velocity squish between the flat portion of the piston head 34 and the underside of the liner 36 as described.

The high velocity squish induces the mushroom shaped motion schematically shown by the directional arrows in the three figures of the drawings. The swirl initiated by the tangential introduction of air into the piston cylinders through the intake ports is enhanced by tangentially oriented injection nozzles 26 which inject a high velocity fuel spray tangentially into the combustion chamber through passages 50 in the cylinder head liner. The high squish and swirl turbulence in the combustion chamber initially coupled with the multiple tangentially oriented injection nozzles provides for relatively instantaneous ignition of the fuel during combustion and generating the high combustion pressures necessary to initiate the power stroke. In the embodiments of FIGS. 1 and 2, the piston head projections 30 and 32 are designed to both emphasize the torroidal motion of the chamber gases and provide some protection to the valve head 25. In the embodiment of FIG. 2 the projection is flared to produce a top surface almost equal to the surface of the valve head, and is juxtaposed to the valve head to provide a substantial secondary squish action forcing gases from the gap between the end of the piston head projection 30 and the face of the valve head 54.

In the embodiment of FIG. 3 the piston head has a recess instead of a projection. At least one of the multiple fuel injector nozzles 26 is radially directed down into the recess chamber 56 to create an upwardly eruptive gas flow that mushrooms into the toroidal pattern defined by the directional arrows in FIG. 3. The eruptive turbulence combined with the squish and squirl generated by the intake and injector arrangement with respect to the combustion chamber configuration generates a rapid ignition without a defined high pressure front reflected from a flat piston head that would cause damage to the valve head 25.

Use of multiple fuel injector nozzles permits a finely atomized spray to be induced through a narrow injector nozzle passage 58 to further enhance the instantaneous ignition and rapid burn that is necessary for adaptation of a diesel engine to a short-stroke, high-speed r.p.m. engine suitable for automotive and other applications requiring quick response to variable load conditions. In this respect, use of multiple injector nozzles permits one or more nozzles to be inactivated during low load conditions. The remaining injector or injectors will be able to deliver the reduced fuel charged under highly atomized conditions dictated by the small nozzle passage. This important feature is not available in single injector systems where a large nozzle passage must be provided for peak performance under high load conditions, which passage is inadequate to fully atomized a reduced flow of fuel injected through the fixed passage under low load conditions. Furthermore, use of multiple fuel injectors permits one of the injectors to act as a preignition pilot that generates a flame in a 10-15 degrees cycle advance of top dead center. The pilot will accelerate detonation and burn of the primary charge when injected. The multiple fuel injectors are electronically operated and controlled by a conventional microprocessor 60 which in turn is connected to a plurality of sensors 62 at various points on the engine to monitor operating and load conditions.

Referring to FIGS. 5-7, a series of combustion chamber configurations 70, 72, and 74 are shown for an opposed piston engine 76 shown only in part in the FIGS. of the drawings. The engine may be of a configuration as described in my copending patent application entitled REGENERATIVE THERMAL ENGINE, filed: Dec. 5, 1985, Ser. No: 805,184. In a manner similar to that of the two-cycle engine with a mono-valve exhaust system described hereinbefore, the combustion chambers are designed to enhance squish and squirl to develop a maximum turbulence for complete and rapid ignition of an injected fuel for a high compression, short-stroke, two-cycle engine. In the embodiments of FIGS. 5-17 and engine, designated generally by the reference numeral 70 is shown in part focusing on the piston cylinder 72 for an opposed-type engine. The engine 70 is of a two-cycle type having opposed pistons 74 with unique head designs as described with reference to each of the particular FIGS. noted in which a series of intake ports 78 and exhaust ports 80 are arranged on opposite ends of the cylinder for scavenging on one end of the cylinder to the other when the pistons 74 are at the end of the their stroke. The intake ports are angled both axially and tangentially or radially, such that air that is introduced to sweep the cylinder squirls about the chamber 84 formed by the cylinder walls 86 and the unique piston heads 75 of the retracted pistons 74.

Peripherally arranged around the central portion of the cylinder 72 are multiple fuel injector nozzles 88 having an angle of orientation that directs the stream of fuel spray into the unique chambers 84 formed when the pistons are in the top dead center of their stroke.

The pistons 74 are connected to suitable connecting rods 90 and have sets of piston rings 92 for maintaining a high pressure compression in the combustion chamber 84. The unique combustion chambers 84 are generally annular in configuration in order to maintain and encourage torroidal turbulence of both the compressed air forced into the chamber during intake and the fuel spray injected into the chambers to initiate combustion and the power stroke. The annular configuration of the chambers as described in reference to the embodiments of FIGS. 1-3 encourage the generated forces in the combustion chamber to be applied longitudinally along the axis of the cylinder 72. In this manner side slap or side forces on the piston which generate frictional drag are minimized.

With reference to the combustion chamber configuration 84 of FIG. 5, the pistons 74 have a piston head 75 formed of similarly configured inserts 96 which may be fabricated of a suitable ceramic, each insert having a torroidal recess 98 with a central conical prominence 100 to encourage the swelling action of the gases in the double torroid chamber 84 that is formed by the composite. At the top dead center, the pistons have a peripheral portions of the head that in close proximity such that gases entrain therein or discharged at high velocity into the central double annulus chamber form. the inserts have spray channels 102 for directing and expanding spray stream of fuel into the central chamber. The squish and squirl as described provides a thorough mix of fuel and compressed air for extremely rapid ignition and combustion. As noted, the plurality of spray injectors permits the spray to be in finally divided particle form and shorten duration to enhance the rapid ignition and combustion.

In the embodiment of FIG. 6, the unique combustion chamber 84 is formed by a piston head 75 on one of the pistons 74a that includes an inset 104 with a recessed annulus 106 having a central conical prominence 108 which is opposed by a prominence 108 on the opposed piston the prominence having the configuration of a truncated cone that conforms with a complimentary peripheral concavity in the insert 104 to form a chamber that develops a squish and squirl as previously described. The fuel injectors are peripherally arranged around the cylinder and directed into the space between the prominence on one piston and the recess on the opposed piston. The prominence is angled to assist on directing the intake air from the intake ports toward the opposite end of the cylinder when the pistons are in their fully retracted positions. Again, the arrangement of the injected nozzles and the configuration of the combustion chamber is designed to enhance the rapid ignition and combustion of injected fuel in the torroidal shaped combustion chambers.

Referring now to the embodiment of FIG. 6, the opposed pistons 74 have an insert 106 in one head and a central projection 108 in the opposite head. The configuration of the insert is such that when the projection moves proximate the central base 110 of the insert a toroidal chamber is formed. The head projection 108 is constructed with a flared top 112 to result in a squish action as previously described for the mono valve system of FIG. 2. As in the other embodiments, multiple fuel injector nozzles 114 are arranged around the periphery of the cylinder with guide channels 116 in the insert for directing the spray in a manner that accentuates the squish and squirl of gases in the combustion chamber for rapid and complete combustion.

Figure 4:
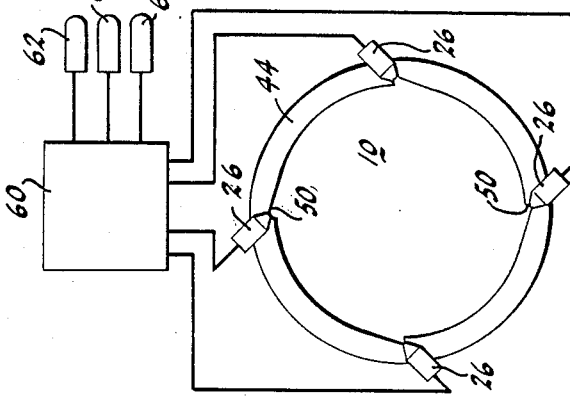
FIG. 4 is a schematic view from a top perspective of a combustion chamber and fuel injector configuration.

In the embodiments of FIGS. 5-7 the fuel injector nozzles are arranged in a manner similar to that shown with respect to the schematic view of FIG. 4 to enable the variable control of the injectors coupled to the injector nozzles by the microprocessor system described. It is to be understood that the configuration of the combustion chambers and the arrangements of the multiple fuel injector nozzles comprise the unique portion of this description and the auxiliary and mechanical components are of a type that is commonly known in the prior art and is conventionally used in automotive systems currently in production.

While the foregoing embodiments of the present invention have been set forth in considerable detail for the purposes of making a complete disclosure of the invention, it may be apparent to those of skill in the art that numerous chambers may be made in such detail without departing from the spirit and principles of the invention.

What is claimed is:

1. A combustion chamber assembly in a two-cycle, internal combustion engine for improving combustion of injected fuel, the engine having a cylinder and at least one piston reciprocatable in the cylinder with the piston and cylinder defining in part a toroidal combustion chamber, the assembly including a plurality of fuel injector nozzles spaced around the cylinder with fuel passages directed tangentially toward the chamber in an arrangement that enhances the toroidal, swirling, compressed air flow during fuel injection, the injector having means for selectively controlling the fuel delivery and fuel timing to each injector nozzle.

2. An improved combustion chamber assembly in a two-cycle internal combustion, engine have a cylinder with a cylinder axis and a top end and a piston with a piston head reciprocatable in the cylinder, the assembly comprising:

a cylinder head capping the cylinder having a centrally positioned, single exhaust valve with a valve face, the valve being aligned with the cylinder axis, a cylinder head liner forming a combustion chamber over the top end of the cylinder, the chamber having a discoidal configuration and a concentric communication passage with the cylinder dimensioned smaller than the cylinder and chamber, and means for generating a toroidal, swirling, compressed air flow during compression strokes of the reciprocating piston said air flow being directed away from the face of the exhaust valve, wherein the means for generating a toroidal air flow includes a central projection on the piston head that projects into the central area of the discoidal chamber wherein the discoidal chamber becomes toroidal, the projection terminating proximate the face of the valve when the piston is at top dead center of a compression stroke, and includes a flat underside on the cylinder head liner and a flat shoulder portion of the piston head that is positioned opposite and proximate the flat underside of the cylinder head liner when the piston is at the top dead center of a compression stroke such that compressed air is squished both from between the central projection and valve face and the flat underside of the cylinder head liner and the flat shoulder portion of the piston head.

3. The assembly of claim 2 wherein the central projection is substantially cylindrical in configuration.

4. The assembly of claim 3 wherein the central projection has a flared base at the junction of the projection and piston.

5. The assembly of claim 4 wherein the central projection has a flared end proximate the face of the valve.

6. The assembly of claim 2 wherein the means for generating a toroidal air flow includes a plurality of angularly directed, spaced fuel injection nozzles, wherein the liner has angularly directed fuel injection passages communicating between the injection nozzles and the chamber for generating a swirl on injection of fuel.

7. The assembly of claim 6 wherein the nozzles have central means for selectively regulating quantity and timing of fuel to the injection nozzles.

* * * * *